United States Patent [19]

Ishii

[11] Patent Number: 4,614,273
[45] Date of Patent: Sep. 30, 1986

[54] FREE STOP RETAINER

[75] Inventor: Hiroyuki Ishii, Tokyo, Japan

[73] Assignee: Sugatsune Kogyo Co., Ltd., Tokyo, Japan

[21] Appl. No.: 616,807

[22] Filed: Jun. 4, 1984

[51] Int. Cl.⁴ .............................................. A47F 5/00
[52] U.S. Cl. ................................... 211/183; 211/207; 248/245; 403/257
[58] Field of Search ............... 211/207, 153, 103, 190, 211/187; 248/244, 245, 246, 231.3, 297.2, 297.5; 403/246, 254, 257

[56] References Cited

U.S. PATENT DOCUMENTS

| | | | |
|---|---|---|---|
| 3,467,352 | 9/1969 | Bohler | 248/246 X |
| 3,672,710 | 6/1972 | Kroopp | 403/256 X |
| 4,278,224 | 7/1981 | Arakawa | 248/246 |
| 4,490,064 | 12/1984 | Ducharme | 403/254 X |

Primary Examiner—Robert W. Gibson, Jr.
Attorney, Agent, or Firm—George B. Oujevolk

[57] ABSTRACT

A free stop retainer which comprises a retainer body formed with an engaging portion and an article retaining portion, a post formed with at least one groove formed longitudinally, the engaging portion elevationally slidably engaged in a longitudinal rail hole formed at the side wall of the post in such a manner that the article retaining portion is projected from the rail hole outwardly, the retainer body formed with a tapered surface opposed to the side wall of the post in such a manner that the space to the side wall becomes the maximum width at the lower end thereof and the minimum width at the upper end thereof. A lever is rotatably formed with a stopper at one end thereof and the stopper is guided on the tapered surface. The lever is elastically urged by a spring in the direction that the stopper urges the side wall of the post. Thus, the free stop retainer can be elevationally slidably engaged with the longitudinal rail hole formed at the side wall of a hollow post, and can also be fixedly secured at the desired position by a simple manual operation without using a tool.

5 Claims, 14 Drawing Figures

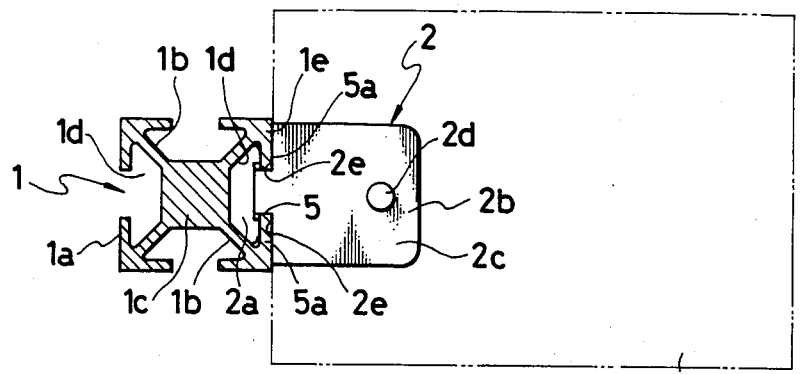
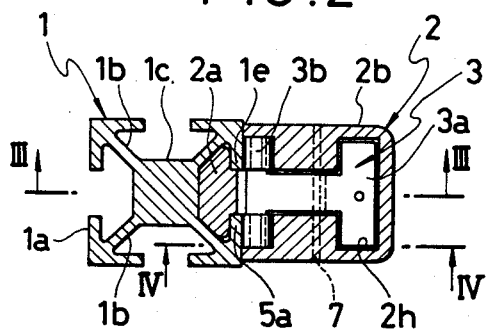
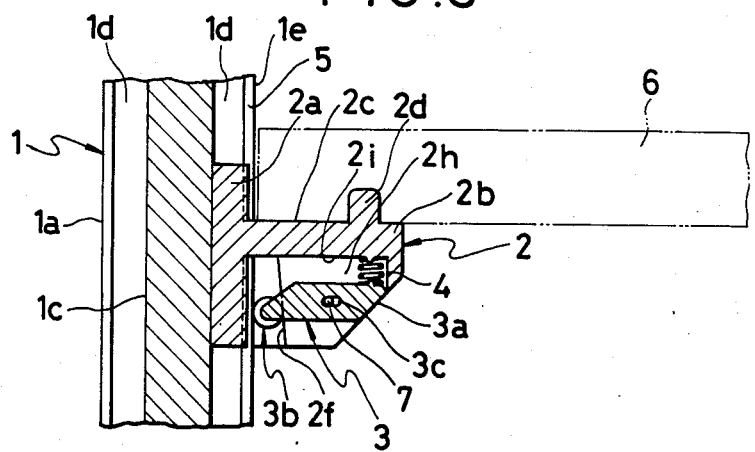

FREE STOP RETAINER

BACKGROUND OF THE INVENTION

This invention relates to a free stop retainer capable of fixedly securing an article adjustably in height at a post such as a side plate provided, for example, to be used for placing a rack for books in a bookcase or hanging a hat.

There have been various structure in which racks are mounted elevationally adjustably in height at rack posts to replace the position between upper and lower positions.

However, in the conventional structure of this type, the rack is inserted into holes perforated at the rack posts and then clamped with screws so as not to rotatably move the rack retainer body, or the rack is engaged in the threaded holes perforated at the rack posts to secure the rack body to the posts. Accordingly, it takes a lot of labor to mount the lack or to replace the position upward or downward. In the clamping type made of wooden posts and side plates, it is necessary to drive a hard material such as metal or hard plastic to the wooden posts and to perforate threaded holes. Even if thus constructed, the structure is readily loosened by a vibration. When the rack plate is replaced between upper and lower positions, frictional scratch produced at the clamping time occurs on the surface of the side plates, which causes improper external appearance.

Since a number of holes and threaded holes should be formed at suitable intervals at the rack posts so as to adjust the height of the rack, it causes large cost, and yet the rack cannot be replaced at the elevational position only in a digital manner by the interval unit between the holes and threaded holes, so that it is difficult to obtain the optimum interval between the racks to meet the size (height) of an article to be placed on the rack, with the result that the space between the racks cannot be effectively utilized as the greatest drawback.

SUMMARY OF THE INVENTION

Accordingly, an object of this invention is to provide a free stop retainer which can eliminate the aforementioned drawbacks of the conventional retainer and can be elevationally slidably engaged with the longitudinal rail hole formed at the side wall of a hollow post, also be fixedly secured at the desired position by a simple manual operation without using a particular tool and used in a rigidly fixed state by placing racks in the desired adjusted height or hanging an article.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is a plan view of a first embodiment of a free stop retainer constructed according to the present invention;

FIG. 2 is a longitudinally sectional plan view of the free stop retainer;

FIG. 3 is a longitudinally sectional view taken along the line III—III in FIG. 2;

DESCRIPTION OF THE PREFERRED EMBODIMENTS

Figure 4:
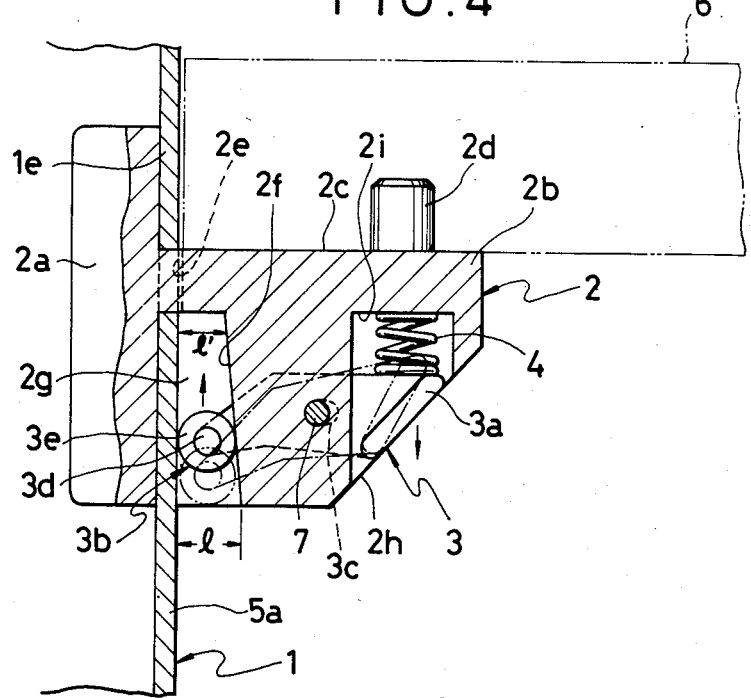
FIG. 4 is an enlarged longitudinal sectional side view as seen by arrows along the line IV—IV in FIG. 2.

The present invention will now be described in more detail with reference to the accompanying drawings.

FIGS. 1 to 4 show a first embodiment of a free stop retainer according to the present invention. The free stop retainer generally comprises a post 1, a retainer body 2, a lever 3 and a spring 4.

The post 1 has an outer wall 1a of rectangular cross section, a core 1c of square cross section connected to the outer wall 1a through diagonal coupling walls 1b, 1b, 1b, 1b arranged diagonally from the core 1c integrally to the outer wall 1a of four corners to form four longitudinal grooves 1d between the coupling walls 1b and 1b and the core 1a within the outer wall 1a in such a manner that a longitudinal rail hole 5 is opened over the entire length at the center of a side wall 1e forming part of the outer wall 1a to communicated with one groove 1d.

On the other hand, the retainer body 2 has an engaging portion 2a and an article retaining portion 2b formed integrally therewith.

The engaging portion 2a is formed in a suitable dimensional shape adapted for internally engaging the cross sectional shape of one groove 1d in the post 1. The article retaining portion 2b has an article holding projection 2d stood on the article placing surface 2c of an article 6 of a rack, in the embodiment exemplified, longitudinal grooves 2e, 2e form symmetrically at both right and left ends of a base end, and right and left side opening edges 5a, 5b of the rail hole 5 engaged with the grooves 2e, 2e in the post 1. In this structure, the retainer body 2 is engaged elevationally slidably along the rail hole 5 by engaging the engaging portion 2a with the groove 1d of the post 1 to project the article retaining portion 2b from the rail hole 5.

The retainer body 2 is disengaged from the rail hole 5 by slidably moving out from the upper or lower end holes of the post 1.

The retainer body 2 further has a tapered surface 2f opposed to the side wall 1e to hold a suitable interval from the outer surface of the side wall 1e of the post 1 in such a manner that the interval becomes the maximum width l at the lower opening and the minimum width l' at the upper end by means of a groove 2g of a predetermined width below the base end of the article retaining portion 2b at the side surface of the groove 2g.

Further, the retainer body 2 has a T-shaped slot 2h formed and opened to communicate with the groove 2g at the lower side of the article retaining portion 2b in the entire shape of H-shaped cross section opened at the lower end for internally mounting the lever 3.

The lever 3 is formed in T-shaped lateral shape adapted for the internal dimension of the slot 2h in its body 3a with a stopper 3b laterally formed at the end in the entire shape of substantially H shape adapted for the groove 2h and the slot 2h.

This lever 3 is pivotally secured to the right and left side walls of the article retaining portion 2b of the retainer body 1 at a shaft 7 substantially at the intermediate thereof to be internally mounted in the groove 2g and slot 2h in such a manner that the stopper 3b is contacted with the tapered surface 2f and a spring 4 is interposed between the other end thereof and the bottom wall 2i of the slot 2h so as to be elastically urged clockwise as designated by an arrow in FIG. 4 and so that the stopper 3b is always interposed between the tapered surface 2f and the side wall 1e of the post 1 to secure the retainer body 2 to the post 1.

The axial hole 3c of the lever 3 is formed in an idle hole, the lever 3 may be rotated counterclockwise as designated by two-dotted broken line in FIG. 4 by pressing the other end of the body 3a by a finger or the like against the tension of the spring 4 to shift the stopper 3b in a direction to isolate from the groove 2g.

It is noted that the post 1 is not limited to the exemplified example in the drawings. For example, the engaging portion 2a may be formed without gap between the side walls 1e formed by a partition plate (not shown) instead of the core 1e and formed with a space slidably engaged therewith. Further, a hollow member of rectangular cross sectional shape may be merely used.

It is further noted that the stopper 3b may be, as shown, symmetrically projected with shafts 3d, 3d from both right and left sides at the end of the body 3b formed of a hard material to rotatably journal rollers 3e, 3e of another members, or that the stopper 3b may be formed with the body 3b of a soft material made of plastic or rubber integrally at the end of the body 3a, in which case the stopper 3b may be of any shape, preferably slidable on the tapered surface 2f by providing in a roller shape or spherical shape.

Figure 5:
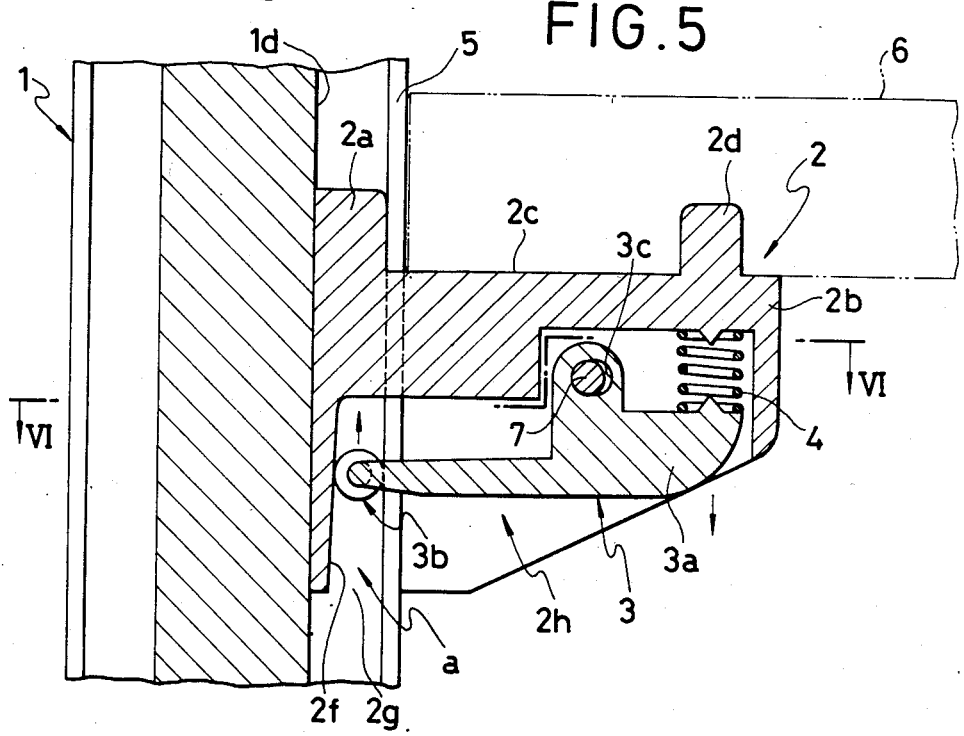
FIG. 5 is an enlarged longitudinally sectional side view of second embodiment of the free stop retainer according to the present invention.
Figure 6:
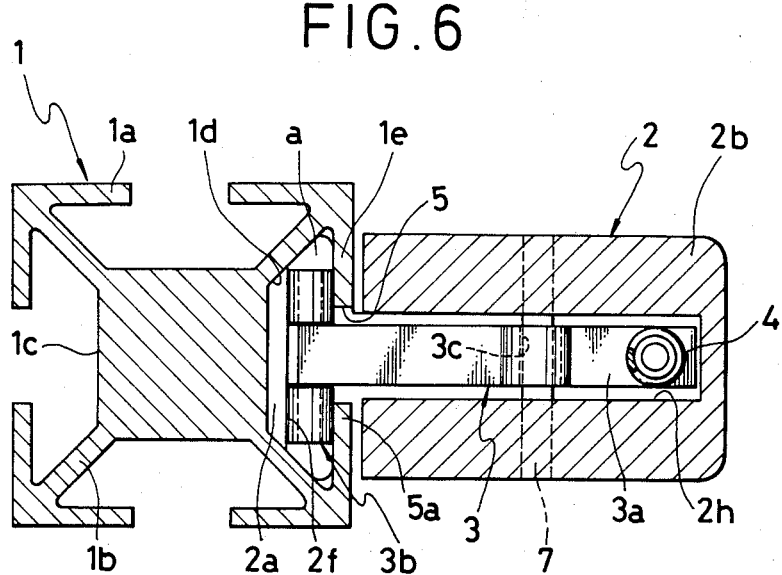
FIG. 6 is a sectional view as seen from arrows along the line VI—VI in FIG. 5.

FIGS. 5 and 6 show a second embodiment of a free stop retainer according to the present invention. A groove 2g is formed at the lower side from the engaging portion 2a of the article retaining portion 2b, a tapered surface 2f is opposed to the inner surface of the side wall 1e of the post 1, and a gap for interposing a stopper 3b is formed between the inner surface of the side wall 1e and the tapered surface 2f.

Further, a slot 2h and the body 3a of the lever 3 are formed substantially at the same cross section so that a lever 3 is rotatably journaled in the slot 2h.

The lever 3 is formed at the right and left side ends with stoppers 3b of substantially in planar T shape. The end of the lever 3 is projected from the rail hole 5 of the post 2 into the groove 2g of the engaging portion 2a engaged with the groove 1d of the post 1 to be disposed in the gap. The other structure is constructed in the same manner as the first embodiment of the free stop retainer.

In the above structure, an article 6 is mounted using the free stop retainer of this embodiment as below.

Necessary number of retainer bodies 2 are engaged in advance with the post 1 as was described previously.

The lever 3 journaled at the retainer body 2 is elastically urged clockwise as designated by an arrow in FIGS. 4 and 5. Thus, the stopper 3b is guided along the tapered surface 2f, interposed between the tapered surface 3f and the side wall 1e of the post 1, and always contacted with the side wall 1e in FIG. 4 and with the inner surface under pressure in FIG. 5. In this manner, the engaging portion 3a is urged to the inner surface of the side wall 1e by the stopper 3b in FIG. 4, and the engaging portion 2a is urged under pressure to the core 1c and the coupling walls 1, 1b so that the retainer body 2 is secured to the post 1 in FIG. 5.

In the above-described secured state, when the rear end of the lever 3 is pressed by a finger or the like, the lever 3 is rotated counterclockwise at the shaft 7 as a center against the tension of the spring. Thus, the stopper 3b provided at the end is rotated in the direction opposite to the arrow, i.e., toward the maximum width of the lower end in the gap as designated by two-dotted broken line in FIG. 4, thereby releasing the pressing to the side wall 1e.

Consequently, the retainer body 2 is released from securing, and the retainer body 2 can freely slide toward the elevational direction of the post 1 along the rail hole 5.

In this manner, in case that the pressing of the lever 3 is released after the retainer body 2 is slidably moved to the desired position, the lever 3 is elastically urged by the spring clockwise. Thus, the stopper 3b is moved toward the upper end in the narrow gap under the guidance of the tapered surface 2f, the stopper 3b thus urges the side wall 1e leftwardly in FIG. 4 and rightwardly in FIG. 5. Therefore, the side wall 1e is interposed between the stopper 3b and the engaging portion 2a in the first embodiment in FIG. 4, and the engaging portion 2a is interposed between the stopper 3b and the core 1c and the coupling walls 1b, 1b in the second embodiment in FIG. 5. Thus, the retainer body 2 is secured at the desired position.

At this time it is noted that the article 6 may be placed in advance on the article retaining portion 2b, and after the retainer body 2 is secured as described above, it may be placed on the article retaining portion 2b.

Figure 7:
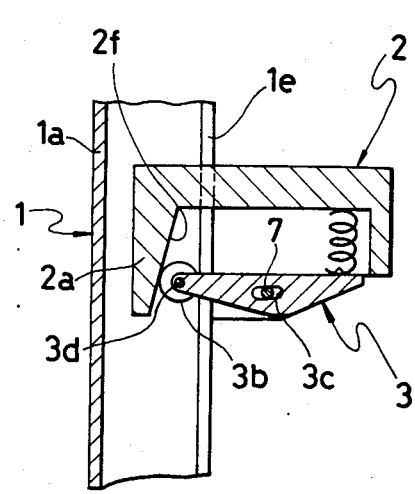
FIGS. 7 and 8 are longitudinally sectional side and plan views of a third embodiment of the free stop retainer according to the present invention.
Figure 8:
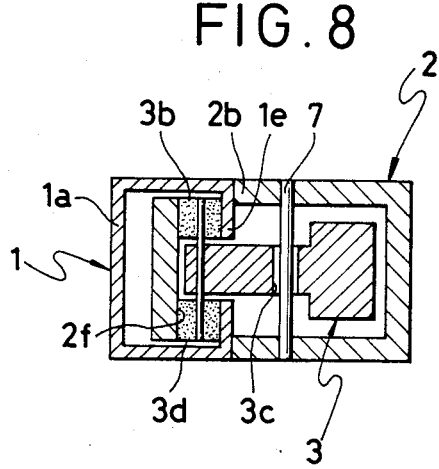
Figure 9A:
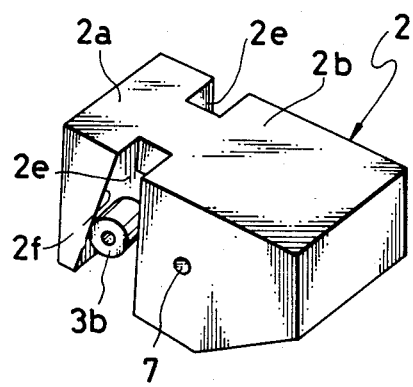
FIG. 9(A) is an upper perspective view of the embodiment.
Figure 9B:
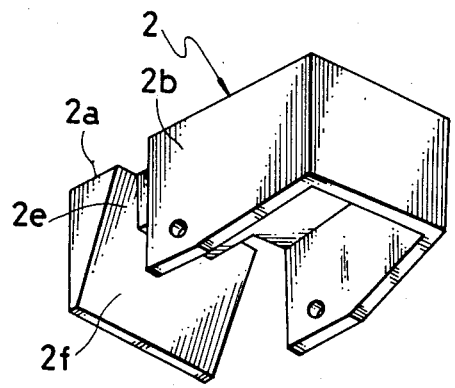
FIG. 9 (B) is a lower perspective view of the embodiment.
Figure 10:
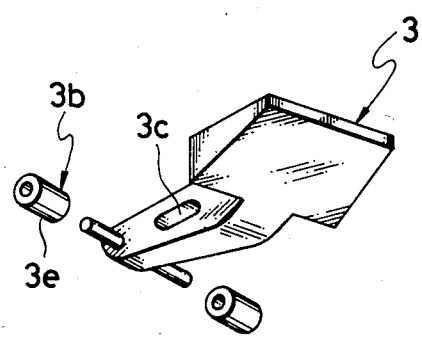
FIG. 10 is a perspective view of the lever of the retainer.

FIGS. 7 and 8 show a third embodiment of a free stop retainer of the invention. In this embodiment, the post 1 employs a mere U-shaped cross section. In this case, before the engaging portion 2a is urged to the outer wall 1a of the post 1 in the secured state, the article retaining portion 2b of the retainer body 2 urges the outer surface of the side wall 1e of the post 1. Thus, the side wall 1e is interposed between the stopper 3b and the article retaining portion 2b, thereby obtaining the secured state. FIGS. 9 and 10 show the arrangement of the retainer body 2 and the lever 3 of FIG. 7.

Figure 11:
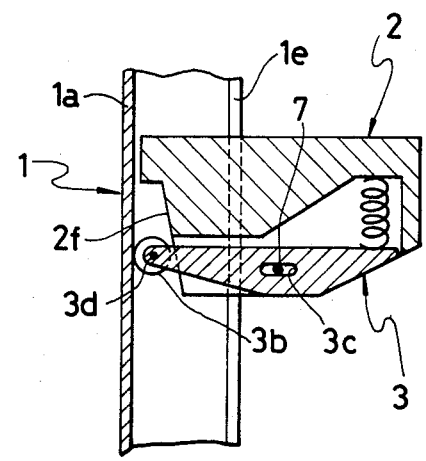
FIGS. 11 and 12 are longitudinally sectional side and plan views of fourth embodiment of the free stop retainer according to the present invention.
Figure 12:
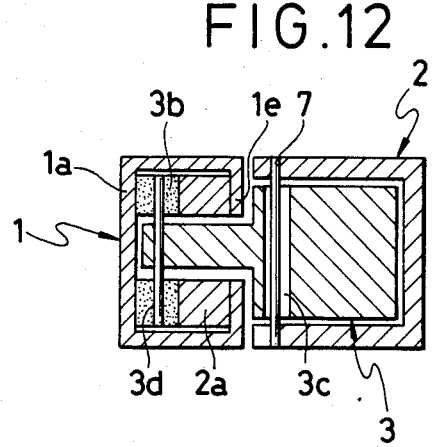
Figure 13A:
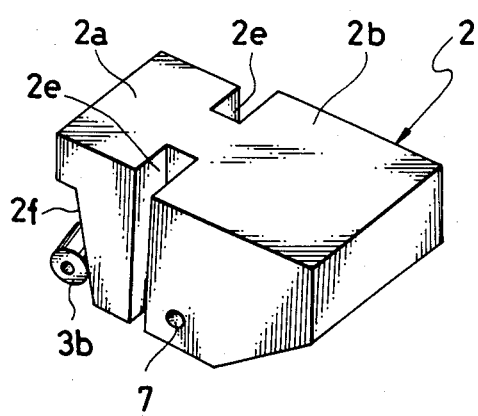
FIG. 13(A) is an upper perspective view of this embodiment.
Figure 13B:
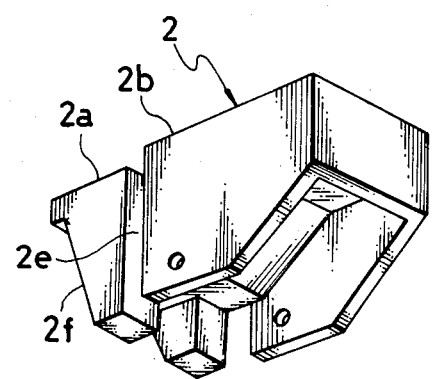
FIG. 13 (B) is a lower perspective view of this embodiment.
Figure 14:
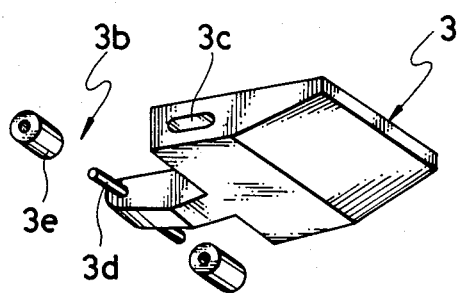
FIG. 14 is a perspective view of the lever of the retainer.

FIGS. 11 and 12 show a fourth embodiment of a free stop retainer of the invention. In this embodiment, the post 1 employs a U-shaped cross section, but the tapered surface 2f of the retainer body 2 is different from those of the previous embodiments, and is formed in an outwardly inverted tapered shape at the base end side, in which the stopper 3b is engaged between the tapered surface 2f and the inner surface of the outer wall 1a of the post 1. Thus, the engaging portion 2a of the retainer body 2 is urged between the stopper 3b and the inner surface of the side wall 1e of the post 1, thereby obtaining the secured state. FIGS. 13 and 14 show the retainer body 2 and the lever 3 shown in FIGS. 11 and 12.

According to the free stop retainer constructed according to the present invention as described above, the retainer body 2 formed with the engaging portion 2a and the article retaining portion 2b is internally engaged elevationally slidably in the rail hole 5 longitudinally formed at the side wall 1e of the post 1 in the hollow engaging portion 2a so that the article retaining portion 2b is projected from the rail hole 5 outwardly, the tapered surface 2f of the retainer body 2 is opposed in space to the side wall 1e of the post 1 in such a manner that the space to the side wall 1e is the maximum width l at the lower end and the minimum width l' at the upper end, and that the lever 3 provided with the stopper 3b is rotatably and the stopper 3b is guided on the tapered surface, and further that the lever 3 is elastically urged by the spring 4 in the direction that the stopper 3b urges the side wall 1e of the post 1. In this manner, the stopper 3b is always guided by the tension to the tapered surface 2f in the direction that the side wall 1e of the post 1 is urged to interpose and secure the retainer body 1 to the post 2. Consequently, the necessary number of levers 3 are engaged in advance to the arrangement of the post 1 to urge the lever 3 to slide and then to release the urging force of the lever 3, thereby securing them to freely place or hang the article 6 on any position. Further, the retainer body 2 can be elevationally moved along the post 1, fixed or moved by the ready operation of only the levers 3. Therefore, the article 6 may be not only placed or hung at the prescribed position, but may also be simply, readily, and rapidly replaced at the elevational positions. In addition, since it is not necessary to provide a number of holes at the post 1, it may not only be inexpensively manufactured but when the load of used state is applied to the retainer body 2, the stopper 3b is advanced further deeply to the tapered surface 2f, thereby strengthening the secured state.

What is claimed is:

1. A free stop retainer comprising:
   (a) a retainer body (2) with an upper and a lower side, an engaging portion, (2a), and an article retaining portion (2b);
   (b) a post (1) with a side wall (1e) having a rail hole (5), said side wall (1e) having an inner and an outer surface also at least one longitudinal groove (1d), said engaging portion (2a) being elevationally slidably engaged in the longitudinal rail hole (5) of the side wall (1e) in such a manner that said article retaining portion (2b) is outwardly projected from the rail hole (5) of the side wall (1e);
   (c) a tapered surface extending from said engaging portion (2a) along one of the surfaces of the side wall (1e) to define a groove (2g) with an upper closed end and a lower open end in such manner that the space next to the side wall is at the maximum width at the lower end of the defined groove (2g) and at the minimum width at the upper end of the defined groove;
   (d) a lever (3) rotatably held in the article retaining portion (2b) with a stopper (3b) at one end and a lever actuating portion at the other end thereof, the stopper (3b) being disposed in the defined groove (2g) and guided along the tapered surface, and,
   (e) spring means acting on the other end of said lever (3) urging said stopper (3b) against the side wall (1e).

2. A free stop retainer as claimed in claim 1 wherein the retainer body (2) has a T-shaped slat (2H) opened to communicate with the defined groove (2g) at the lower side of the article retaining portion (2b), said lever (3) being internally mounted therein.

3. A free stop retainer as claimed in claim 1, wherein said tapered surface extends so as to be opposed to the inner surface of the side wall (1c).

4. A free stop retainer as claimed in claim 1, wherein said tapered surface extends so as to be opposed to the outer surface of the side wall (1e).

5. A free stop retainer as claimed in claim 1, wherein the post (1) has a U-shaped cross-section so that the side wall (1e) is interposed between the stopper (3b) and the article retaining portion (2b).

* * * * *